US009103282B2

(12) United States Patent
Charron et al.

(10) Patent No.: US 9,103,282 B2
(45) Date of Patent: Aug. 11, 2015

(54) STRUCTURAL COOLING FLUID TUBE FOR SUPPORTING A TURBINE COMPONENT AND SUPPLYING COOLING FLUID TO TRANSITION SECTION

(75) Inventors: Richard Charron, West Palm Beach, FL (US); Daniel Pierce, Port St. Lucie, FL (US)

(73) Assignee: Siemens Energy, Inc., Orlando, FL (US)

( * ) Notice: Subject to any disclaimer, the term of this patent is extended or adjusted under 35 U.S.C. 154(b) by 965 days.

(21) Appl. No.: 13/277,630

(22) Filed: Oct. 20, 2011

(65) Prior Publication Data
US 2013/0098065 A1    Apr. 25, 2013

(51) Int. Cl.
| F01D 5/08 | (2006.01) |
| F01D 25/08 | (2006.01) |
| F02C 7/12 | (2006.01) |
| F02C 7/20 | (2006.01) |
| F02C 7/36 | (2006.01) |

(52) U.S. Cl.
CPC ... *F02C 7/12* (2013.01); *F01D 5/08* (2013.01); *F01D 25/08* (2013.01); *F02C 7/20* (2013.01); *F02C 7/36* (2013.01)

(58) Field of Classification Search
CPC .............. F01D 5/08; F01D 5/12; F01D 25/08
See application file for complete search history.

(56) References Cited

U.S. PATENT DOCUMENTS 6,508,620 B2 *   1/2003   Sreekanth et al. ............ 415/115
2013/0098064 A1 *   4/2013   Charron et al. ................. 60/796

* cited by examiner

*Primary Examiner* — Nathaniel Wiehe
*Assistant Examiner* — Michael Shen

(57) ABSTRACT

A shaft cover support for a gas turbine engine is disclosed. The shaft cover support not only provides enhanced support to a shaft cover of the gas turbine engine, but also includes a cooling fluid chamber for passing fluids from a rotor air cooling supply conduit to an inner ring cooling manifold. Furthermore, the shaft cover support may include a cooling shield supply extending from the cooling fluid chamber between the radially outward inlet and the radially inward outlet on the radially extending region and in fluid communication with the cooling fluid chamber for providing cooling fluids to a transition section. The shaft cover support may also provide additional stiffness and reduce interference of the flow from the compressor. In addition, the shaft cover support accommodates a transition section extending between compressor and turbine sections of the gas turbine engine.

22 Claims, 5 Drawing Sheets

STRUCTURAL COOLING FLUID TUBE FOR SUPPORTING A TURBINE COMPONENT AND SUPPLYING COOLING FLUID TO TRANSITION SECTION

STATEMENT REGARDING FEDERALLY SPONSORED RESEARCH OR DEVELOPMENT

Development of this invention was supported in part by the United States Department of Energy, Advanced Turbine Development Program, Contract No. DE-FC26-05NT42644. Accordingly, the United States Government may have certain rights in this invention.

FIELD OF THE INVENTION

This invention is directed generally to gas turbine engines, and more particularly to components useful to support shaft covers between compressor and turbine sections in gas turbine engines.

BACKGROUND OF THE INVENTION

Typically, gas turbine engines include a compressor for compressing air, a combustor for mixing the compressed air with fuel and igniting the mixture, and a turbine blade assembly for producing power. As shown in FIG. 1, a typical gas turbine engine includes a shaft cover 2 that is supported in place downstream from a compressor section 3 and upstream from a turbine section 4. The shaft cover 2 surrounds the shaft extending from the compressor section 3 to the turbine section 4. The shaft cover is typically supported in place with twelve shaft cover support struts 5 extending from the outer case to the shaft cover 2. The struts 5 are solid and provide structural support only. The struts 5 support the shaft cover 2 but also create an impediment to the compressor air flow.

The gas turbine engine also includes a plurality of rotor air cooling pipes 6 that extend radially inward through the compressor air flowpath. The position of the rotor air cooling pipes 6 creates additional obstructions in the compressor air flowpath. As such, the rotor air cooling pipes 6 further reduce the effectiveness of the compressor air flow and the turbine engine.

SUMMARY OF THE INVENTION

This invention is directed to a shaft cover support system for a gas turbine engine. The shaft cover support system includes a shaft cover support that not only provides enhanced, stiffer support to a shaft cover of the gas turbine engine, but may also include a cooling fluid chamber for passing fluids from a rotor air cooling supply conduit to an inner ring cooling manifold. In addition, the shaft cover support system may include a cooling shield supply extending from the cooling fluid chamber between the radially outward inlet and the radially inward outlet on the radially extending region and in fluid communication with the cooling fluid chamber for providing cooling fluids to a transition section. As such, the shaft cover support may accomplish in a single component what was only partially accomplished in two components in conventional configurations. In addition, the shaft cover support may accommodate a transition section extending between compressor and turbine sections of the gas turbine engine. The shaft cover support may have a radially extending region that is axially offset from the inlet and outlet that enables the shaft cover support to surround the transition section, thereby permitting a reduction in overall length of this section of the gas turbine engine.

The cooling shield supply may be configured to direct a portion of the fluids flowing through the cooling fluid chamber to the transition section, and in at least one embodiment, into a cooling shield within the transition section. The cooling shield supply may extend from the cooling fluid chamber between the radially outward inlet and the radially inward outlet and in fluid communication with the cooling fluid chamber. The cooling shield supply may include one or more first outlets and one or more second outlets separated by at least one inlet. The first outlet and the second outlet of the cooling shield supply may be configured to exhaust fluids in a same direction as the radially inward outlet. The cooling shield supply may have any appropriate shaped cross-sectional shape. In one embodiment, the cooling shield supply may have a cross-sectional shape that is dictated by the space in which the cooling shield supply is positioned, and thus, may have changing shapes. In another embodiment, the cooling shield supply may have a generally cylindrical cross-sectional shape and may be formed from cylindrical tubing. The inlet of the cooling shield supply may be coupled to the cooling fluid chamber at a surface on the radially extending region nearest the radially outward inlet and the radially inward outlet.

The shaft cover support system may include components of a turbine engine such as a turbine vane carrier that supports the shaft cover support. A rotor air cooling supply may be coupled to the radially outward inlet of the shaft cover support for supplying cooling fluid to the shaft cover support and an inner ring cooling manifold may attached to the radially inward outlet. At least one transition section may extend through the void created by the radially extending region of the shaft cover support that is axially offset from the radially inward outlet and radially outward inlet.

The shaft cover support may include a cooling fluid chamber formed from at least one hollow cavity contained within the cooling fluid chamber, a radially outward inlet at a first end of the cooling fluid chamber and a radially inward outlet at a second end of the cooling fluid chamber. The shaft cover support may also include a radially outward axial mounting device coupled to an outerwall forming the cooling fluid chamber near the radially outward inlet and a radially inward axial mounting device coupled to the outerwall forming the cooling fluid chamber near the radially inward outlet. The radially inward and radially outward inlet may be generally aligned with each other, and a radially extending region of the cooling fluid chamber may be offset axially to accommodate a transition section of the turbine engine. The cooling fluid chamber may be formed from a first axially extending region and a second axially extending region separated from the first axially extending region by a radially extending region that is in fluid communication with the first and second axially extending regions. The first axially extending region may be longer than the second axially extending region. The radially extending region may be positioned at an acute angle relative to the first axially extending region. The first axially extending region may be coupled to the radially extending region via a first curved conduit section. The second axially extending region may be coupled to the radially extending region via a second curved conduit section. The shaft cover support may also include a radially outer flange having a linear surface with a plurality of orifices configured to receive fasteners. A radially inner attachment surface may be formed from a linear surface with a plurality of orifices configured to receive fasteners. The shaft cover support may include an outward facing attachment flange formed from a linear surface with a plurality of orifices configured to receive fasteners. The shaft cover support may also include a radially extending inlet transition extending radially from an upstream end of the first axially extending region. In one embodiment, the cooling fluid chamber may be elongated and may have a cross-sectional shape that is dictated by the space in which the cooling fluid chamber is positioned, and thus, may have changing shapes. In another embodiment, the cooling fluid chamber of the shaft cover support may be generally cylindrical. In yet another embodiment, the cooling fluid chamber may be generally square.

An advantage of this invention is that the cooling shield supply may be configured to direct a portion of the fluids flowing through the cooling fluid chamber into the transition section to cooling the transition section while also providing enhanced, stiffer support to a shaft cover of the gas turbine engine and passing fluids from a rotor air cooling supply conduit to an inner ring cooling manifold.

Another advantage of this invention is that the shaft cover support not only supports the shaft cover of the turbine engine, but is also enclosed to form a cooling fluid chamber to pass rotor cooling fluids.

Yet another advantage of this invention is that the shaft cover support eliminates the need to use rotor air cooling pipes attached to the inner ring cooling manifold to supply cooling fluids that pass through the compressor exit air flowpath and interfere with the flow by forming an obstruction in the flowpath.

Another advantage of this invention is that the shaft cover support may have increased stiffness relative to conventional struts, thereby enabling the transition section or the shaft cover, or both, to be more rigidly secured.

Still another advantage of this invention is that the inner manifold provides a steady seal support interface for the shaft cover, the transition section and other sealing features by reducing seal interface displacements.

Another advantage of this invention is that the shaft cover support may be used to replace conventional shaft cover supports, which cross the compressor exhaust flowpath in twelve places thereby interfering with the compressor exhaust flow.

Yet another advantage of this invention is that the shaft cover support supports the ID portion of turbine vane one and supports the ID of the transition exit.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF EMBODIMENTS OF THE INVENTION

Figure 1:
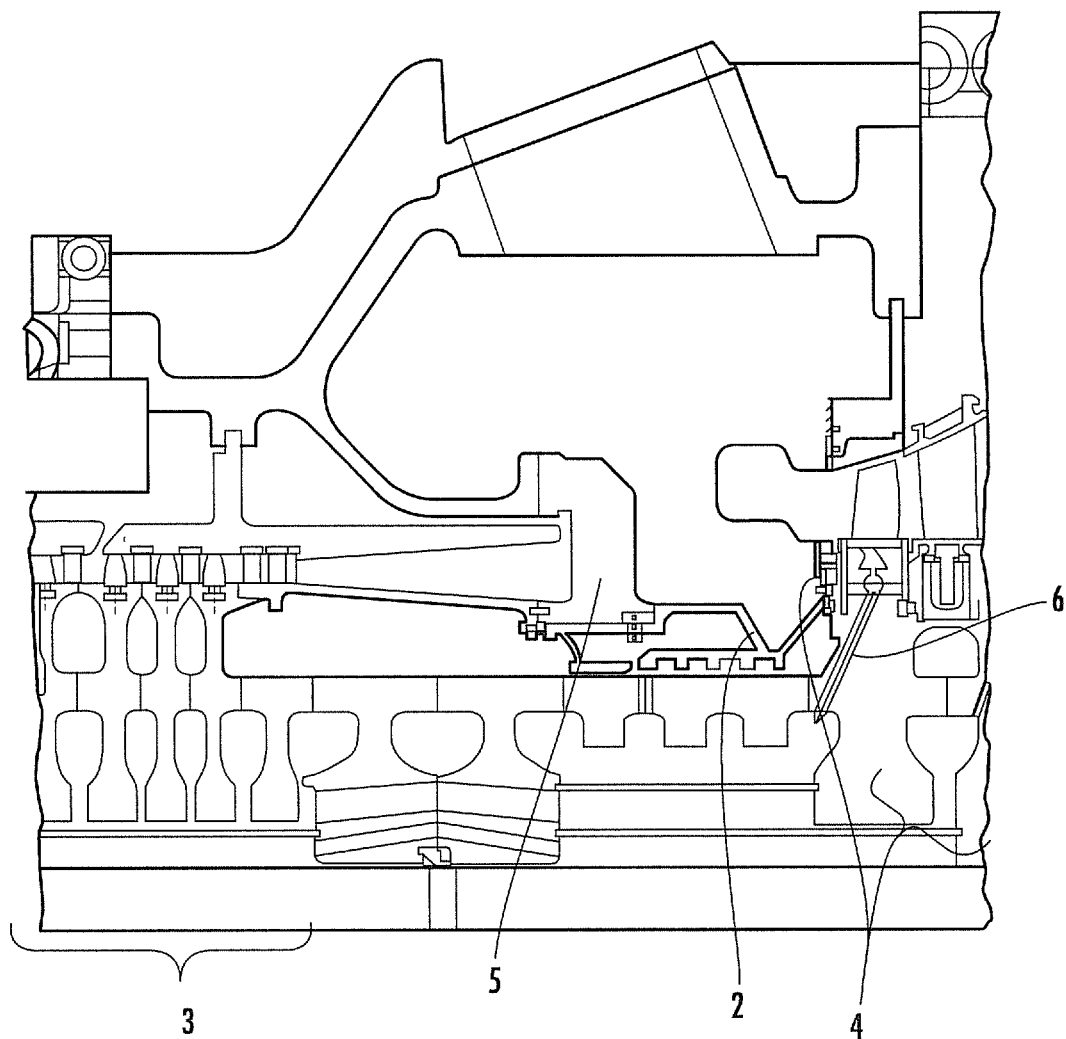
FIG. 1 is a partial perspective view of a conventional turbine engine.
Figure 2:
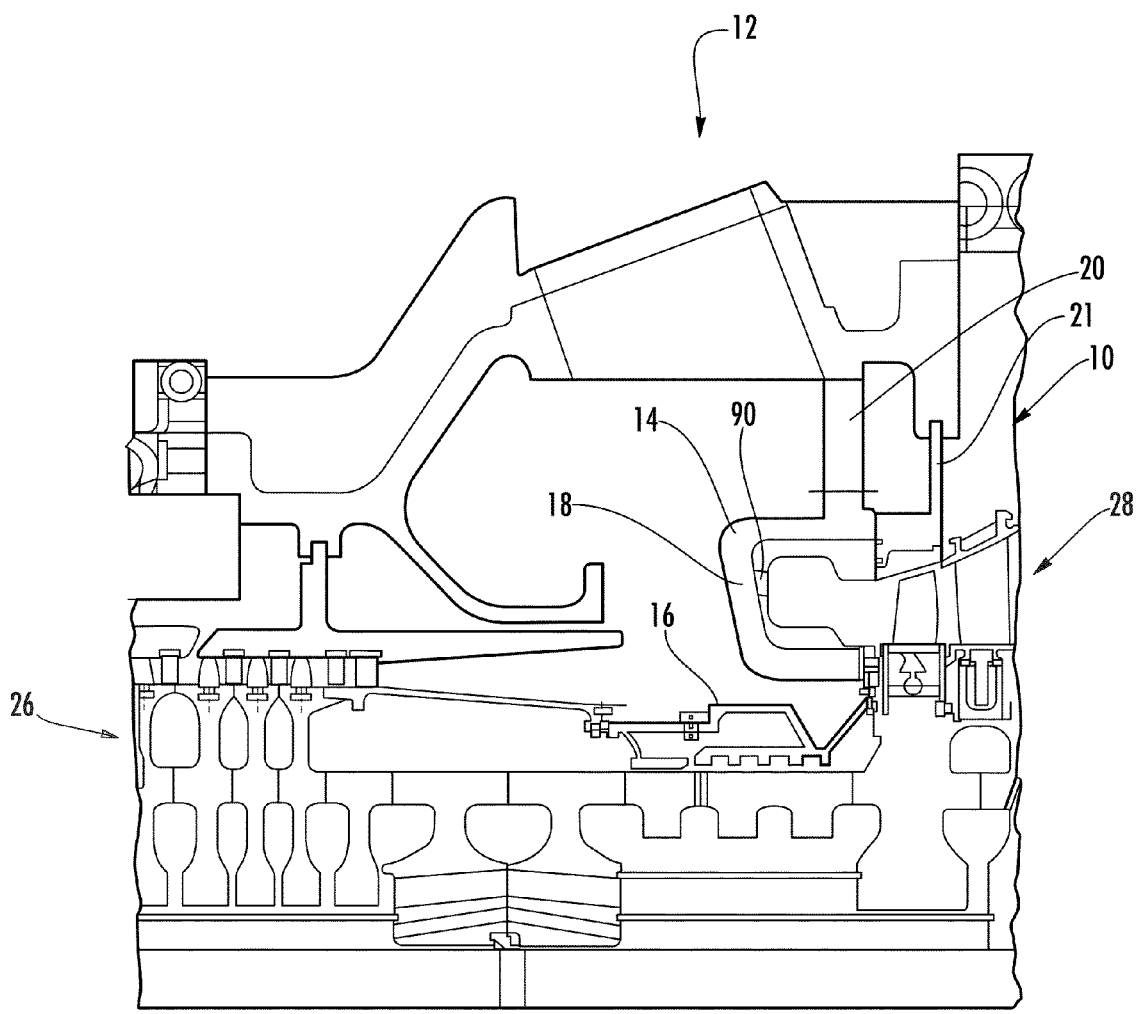
FIG. 2 is a partial perspective view of a turbine engine with the shaft cover support system.

As shown in FIGS. 2-6, this invention is directed to a shaft cover support system 10 for a gas turbine engine 12 is disclosed. The shaft cover support system 10 may include a shaft cover support 14 that not only provides enhanced, stiffer, support to a shaft cover 16 of the gas turbine engine 12, but may also include a cooling fluid chamber 18 for passing fluids from a rotor air cooling supply conduit 20 to an inner ring cooling manifold 22. In addition, the shaft cover support system 10 may include a cooling shield supply 90 extending from the cooling fluid chamber 18 between the radially outward inlet 32 and the radially inward outlet 34 on the radially extending region 30 and in fluid communication with the cooling fluid chamber 18 for providing cooling fluids to a transition section 24. As such, the shaft cover support 14 may accomplish in a single component what was previously only partially accomplished with multiple components. In addition, the shaft cover support 14 may accommodate a transition section 24 extending between compressor and turbine sections 26, 28 of the gas turbine engine 12. The shaft cover support 14 may have a radially extending region 30 that is axially offset from the inlet 32 and outlet 34 that enables the shaft cover support 14 to surround the transition section 24, thereby permitting a reduction in overall length of this section of the gas turbine engine 12.

Figure 3:
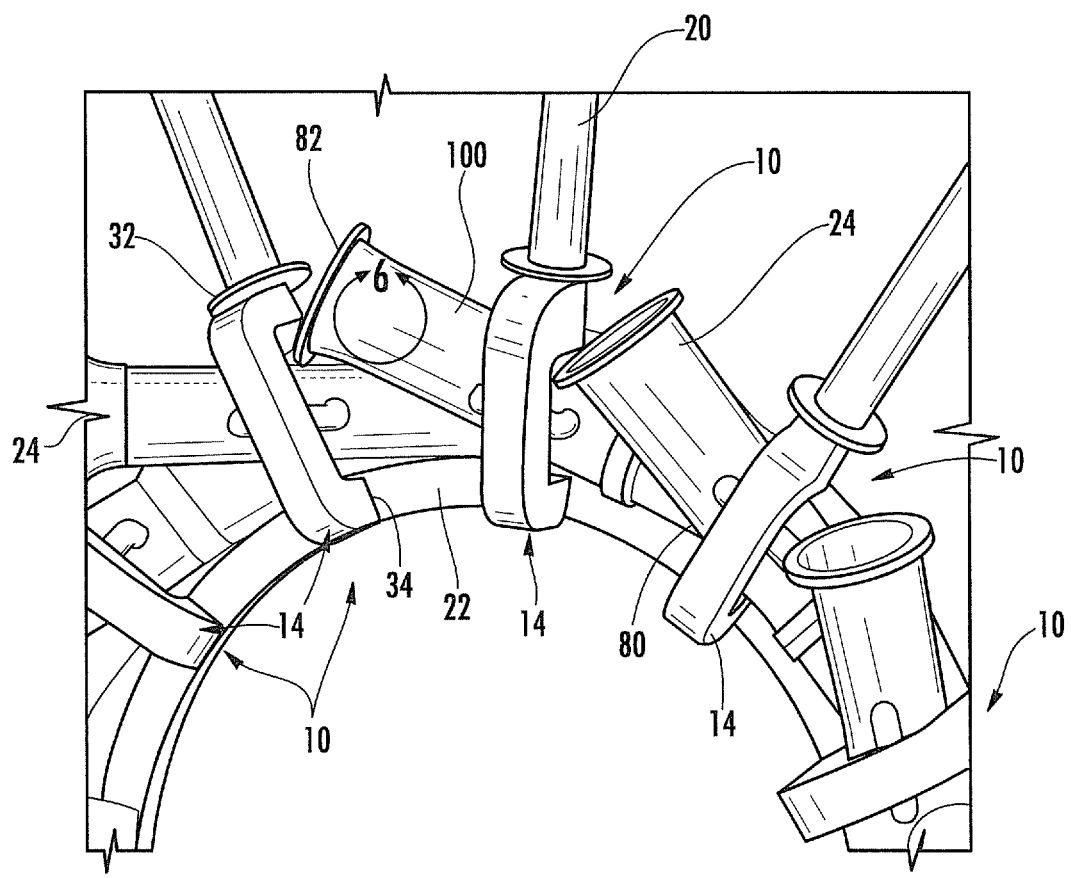
FIG. 3 is a partial perspective view of the shaft cover support system.

As shown in FIG. 3, the turbine engine shaft cover support system 10 may include components of a turbine engine 12, such as a turbine vane carrier 21, to which the shaft cover support 14 may be attached. A rotor air cooling supply 20 may be coupled to the radially outward inlet 32 of the shaft cover support 14 for supplying cooling fluid to the shaft cover support 14. An inner ring cooling manifold 22 may attached to the radially inward outlet 34. At least one transition section 24 may extend through the void created by the radially extending region 30 of the shaft cover support 14 that is axially offset from the radially inward outlet 34 and radially outward inlet 32.

Figure 5:
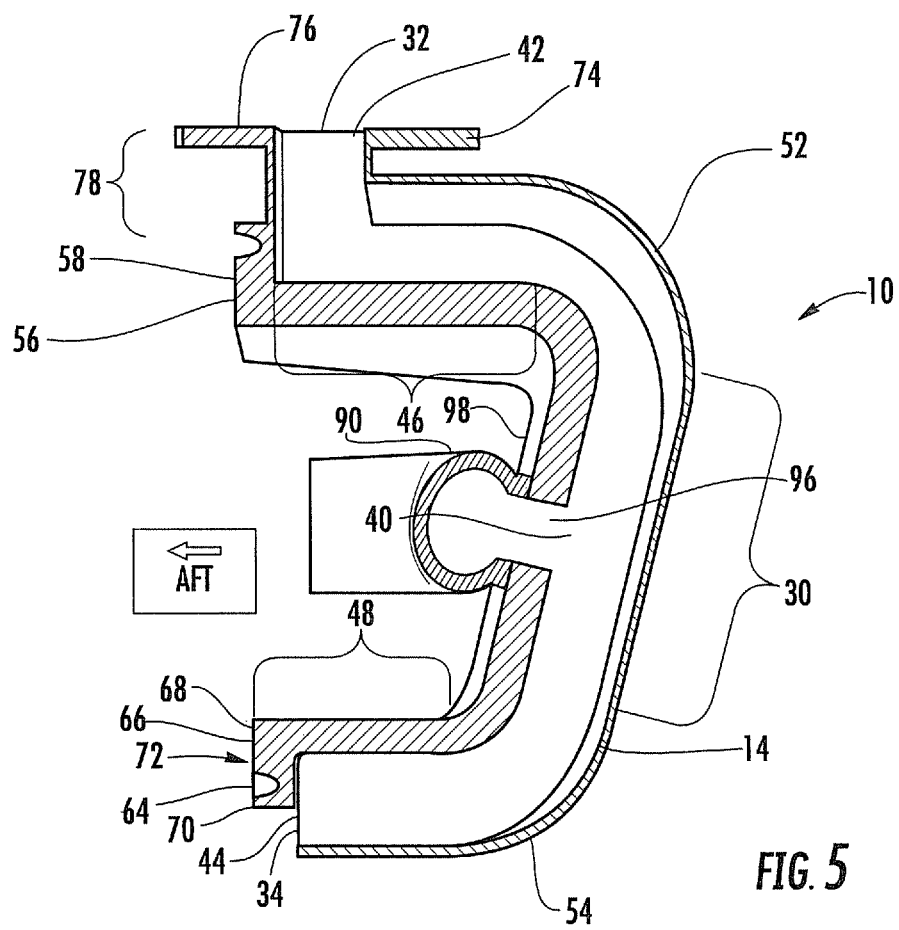
FIG. 5 is a cross-sectional view of the shaft cover support taken along section line 5-5 in FIG. 4.

As shown in FIG. 5, the shaft cover support 14 may be formed from a cooling fluid chamber 18 having at least one hollow cavity 40 contained within the cooling fluid chamber 18. A radially outward inlet 32 may be positioned at a first end 42 of the cooling fluid chamber 18. The radially inward outlet 34 may be positioned at a second end 44 of the cooling fluid chamber 18. The second end 44 may be generally opposite to the first end 42, such that the first end 42, when positioned in the gas turbine engine 12, is positioned radially outward from the second end 44. In one embodiment, the radially inward outlet 34 and radially outward inlet 32 may be generally aligned with each other, and a radially extending region 30 of the cooling fluid chamber 18 may be axially offset to accommodate a transition section 24 of the turbine engine 12. In other embodiments, the radially inward outlet 34 and radially outward inlet 32 may be offset from each other. The cooling fluid chamber 18 may be formed from a first axially extending region 46 and a second axially extending region 48 separated from the first axially extending region 46 by a radially extending region 30 that is in fluid communication with the first and second axially extending regions 46, 48. The first axially extending region 46 may be longer than the second axially extending region 48. As such, the radially extending region 30 may be positioned at an acute angle relative to the first axially extending region 46. The first axially extending region 46 may be coupled to the radially extending region 30 via a first curved conduit section 52. The second axially extending region 48 may be coupled to the radially extending region 30 via a second curved conduit section 54.

Figure 6:
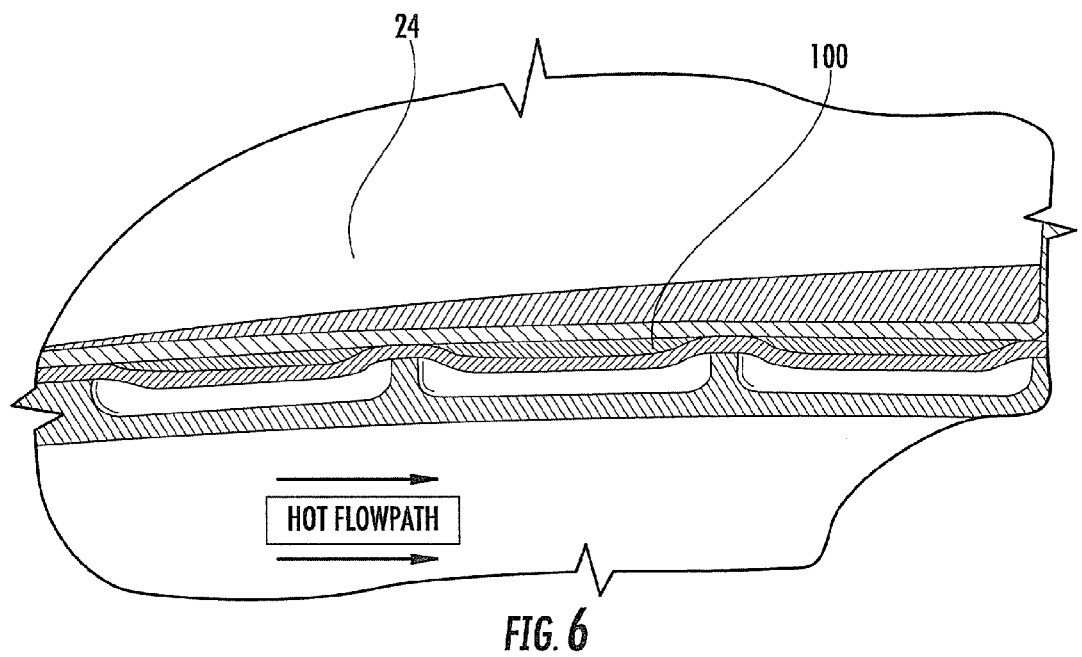
FIG. 6 is a detail view of a transition section taken at detail line 6-6 in FIG. 3.

The cooling shield supply 90, as shown in FIGS. 2-5, may be configured to direct a portion of the fluids flowing through the cooling fluid chamber 18 to the transition section 24, and in at least one embodiment, into a cooling shield 100 within the transition section 24, as shown in FIG. 6. The cooling shield supply 90 may enable cooling fluids to be passed radially inward, such as radially from the OD to the ID, without crossing the compressor flow path or the flow path from the combustors positioned within the transition sections 24. The cooling shield supply 90 may extend from the cooling fluid chamber 18 between the radially outward inlet 32 and the radially inward outlet 34 and in fluid communication with the cooling fluid chamber 18. The cooling shield supply 90 may include one or more first outlets 92 and one or more second outlets 94 separated by at least one inlet 96. The cooling shield supply 90 may have a general C-shape that is offset 90 degrees from the generally C-shaped shaft cover support 14. The first outlet 92 and the second outlet 94 of the cooling shield supply 90 may be configured to exhaust fluids in a same direction as the radially inward outlet 34.

The cooling shield supply 90 may have any appropriate shaped cross-sectional shape. In one embodiment, the cooling shield supply 90 may be elongated and may have a cross-sectional shape that is dictated by the space in which the cooling shield supply 90 is positioned, and thus, may have changing shapes. In at least one embodiment, the cooling shield supply 90 may have a generally cylindrical cross-sectional shape and may be formed from cylindrical tubing. The inlet 96 of the cooling shield supply 90 may be coupled to the cooling fluid chamber 18 at a surface 98 on the radially extending region 30 nearest the radially outward inlet 32 and the radially inward outlet 34.

Figure 4:
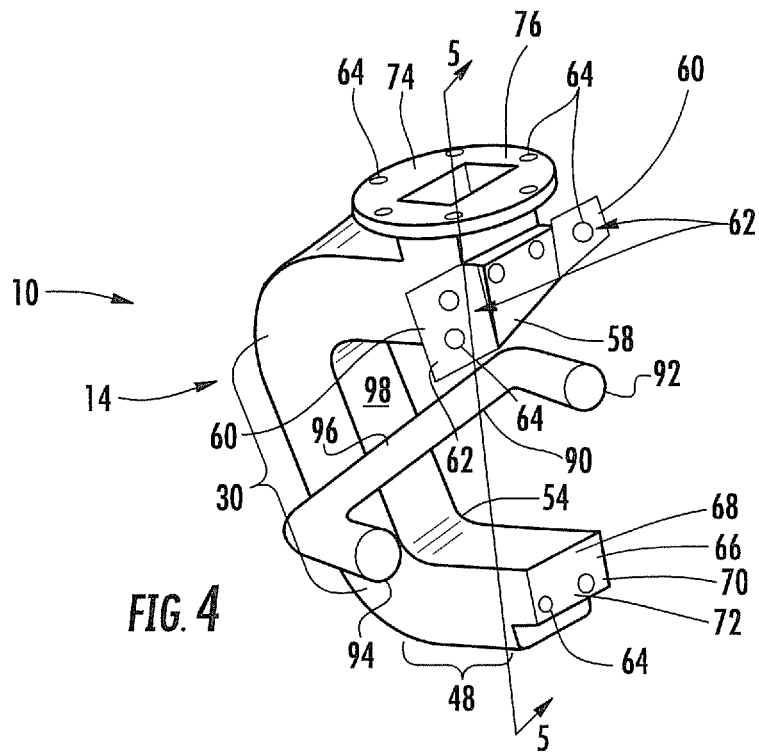
FIG. 4 is a perspective view of the shaft cover support.

The shaft cover support 14 may include a radially outward axial mounting device 56 coupled to an outerwall 58 forming the cooling fluid chamber 18 near the radially outward inlet 32. As shown in FIG. 4, the radially outer flange 60 may have a linear surface 62 with a plurality of orifices 64 configured to receive fasteners. The shaft cover support 14 may also include a radially inward axial mounting device 66 coupled to the outerwall 68 forming the cooling fluid chamber 18 near the radially inward outlet 34. A radially inner attachment surface 70 may be formed from a linear surface 72 with a plurality of orifices 64 configured to receive fasteners. The shaft cover support 14 may also include an outward facing attachment flange 74 formed from a linear surface 76 with a plurality of orifices 64 configured to receive fasteners. The outward facing attachment flange 74 may be used to attach the shaft cover support 14 to the rotor air cooling supply 20.

The shaft cover support 14 may also include a radially extending inlet transition 78, as shown in FIG. 5, extending radially from an upstream end of the first axially extending region 46. The radially extending inlet transition 78 may have the same cross-sectional shape as the remaining portions of the shaft cover support 14 or may have a differently shaped cross-section. The radially extending inlet transition 78 may be attached orthogonally to the first axially extending region 46. In other embodiments, the radially extending inlet transition 78 may be attached to the first axially extending region 46 at an acute angle.

The cooling fluid chamber 18 may have any appropriate cross-sectional area. In one embodiment, the cooling fluid chamber 18 may be elongated and may have a cross-sectional shape that is dictated by the space in which the cooling fluid chamber 18 is positioned, and thus, may have changing shapes. In particular, the cross-sectional area of the cooling fluid chamber 18 may be generally cylindrical. In another embodiment, the cooling fluid chamber may be generally square.

The shaft cover support system 10 may be configured to support the shaft cover 16 within the gas turbine engine 12 and to provide cooling fluids to the inner ring cooling manifold 22. The shaft cover support 14 of the shaft cover support system 10 may have sufficient stiffness to support the shaft cover 16 within the engine 12 such that convention support struts are not needed. The shaft cover support 14 may be stiffer than conventional struts. In addition, the shaft cover support 14 may be include the inner cooling fluid chamber 18 for passing fluids from the rotor air cooling supply conduit 20 to the inner ring cooling manifold 22. The shaft cover support 14 may be configured such that the overall length of the turbine engine 12 may be shortened, thereby resulting in weight savings and cost savings. In particular, the shaft cover support 14 may include the radially extending region 30 that is offset from the inlet 32 and outlet 34 that enables the shaft cover support 14 to surround the transition section 24. The shaft cover support 14 may thus be positioned around the transition section 24 without having to shift the inlet 32 and outlet 34 axially.

As shown in FIG. 3, the transition section 24 may be configured such that an outlet 80 may be offset from an inlet 82 in the axial direction. The term "offset" as used herein and in the claims means that the outlet is spaced from the inlet. The outlet 80 may also be offset from the inlet 82 in a tangential direction such that a gas flow may be discharged from the outlet 80 at an angle between the longitudinal direction and the tangential direction when the transition section 24 is located between the compressor and the first stage blade array of the turbine section to receive the gas flow from the compressor section 26 into the transition section 24 through the inlet 82 and to discharge the gas flow toward the first stage blade array of the turbine section 24. Such a transition section 24 may be positioned as shown in FIG. 3 and the shaft cover support 14. may surround the transition section 24.

During use, cooling fluids may flow from a rotor air cooling supply 20 and into the radially outward inlet 32 of the shaft cover support 14. The cooling fluid may flow into the radially extending inlet transition 78 extending radially from the upstream end of the first axially extending region 46. The cooling fluid may then flow into the first axially extending region 46, through the first curved conduit section 52, into the radially extending region 30, through the second curved conduit section 54, and into the second axially extending region 48. The cooling fluid may then be passed through the radially inward outlet 34 and into the inner ring cooling manifold 22. The at least one transition section 24 may extend through the void created by the radially extending region 30 of the shaft cover support 14 that is offset from the radially inward outlet 34 and radially outward inlet 32. Simultaneously during use, the shaft cover support 14 supports the shaft cover 16 in the gas turbine engine 12.

While cooling fluids are flowing through the radially extending region 30, a portion of the cooling fluids in the radially extending region 30 may pass into the inlet cooling shield supply 90. Cooling fluids may flow through the cooling shield supply 90 and may be exhausted out of the first outlet 92 and into the transition section 24 or may be exhausted out of the second outlet 94 and into the transition section 24. In one embodiment, the cooling fluids may be passed through the first or second outlets 92, 94 and into a cooling shield 100 of the transition section 24 to cool the transition section 24 that directs a hot gas path downstream of a combustor.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A shaft cover support for a gas turbine engine, comprising:
- a cooling fluid chamber having at least one hollow cavity contained within the cooling fluid chamber;
- a radially outward inlet at a first end of the cooling fluid chamber;
- a radially inward outlet at a second end of the cooling fluid chamber;
- a radially outward axial mounting device coupled to an outer wall forming the cooling fluid chamber near the radially outward inlet;
- a radially inward axial mounting device coupled to the outer wall forming the cooling fluid chamber near the radially inward outlet; and
- a cooling shield supply extending from the cooling fluid chamber between the radially outward inlet and the radially inward outlet and in fluid communication with the cooling fluid chamber.

2. The shaft cover support of claim 1, wherein the cooling shield supply includes at least one first outlet and at least one second outlet separated by at least one inlet.

3. The shaft cover support of claim 2, wherein at least one first outlet and at least one second outlet of the cooling shield supply are configured to exhaust fluids in a same direction as the radially inward outlet.

4. The shaft cover support of claim 2, wherein the cooling shield supply is generally elongated.

5. The shaft cover support of claim 1, wherein the radially inward outlet and radially outward inlet are generally aligned with each other, and a radially extending region of the cooling fluid chamber is offset axially relative to the radially inward outlet and radially outward inlet to accommodate a transition of the turbine engine.

6. The shaft cover support of claim 5, wherein the cooling fluid chamber is formed from a first axially extending region and a second axially extending region separated from the first axially extending region by a radially extending region that is in fluid communication with the first and second axially extending regions.

7. The shaft cover support of claim 6, wherein the at least one inlet of the cooling shield supply is coupled to the cooling fluid chamber at a surface on the radially extending region nearest the radially outward inlet and the radially inward outlet.

8. The shaft cover support of claim 6, wherein the first axially extending region is longer than the second axially extending region.

9. The shaft cover support of claim 8, wherein the radially extending region is positioned at an acute angle relative to the first axially extending region.

10. The shaft cover support of claim 8, wherein the first axially extending region is coupled to the radially extending region via a first curved conduit section, and the second axially extending region is coupled to the radially extending region via a second curved conduit section.

11. The shaft cover support of claim 8, further comprising a radially outer flange having a linear surface with a plurality of orifices configured to receive fasteners and a radially inner attachment surface formed from a linear surface with a plurality of orifices configured to receive fasteners.

12. The shaft cover support of claim 8, further comprising an outward facing attachment flange formed from a linear surface with a plurality of orifices configured to receive fasteners and a radially extending inlet transition extending radially from an upstream end of the first axially extending region.

13. The shaft cover support of claim 1, wherein the cooling fluid chamber is generally elongated.

14. The shaft cover support of claim 1, wherein the cooling fluid chamber is generally square.

15. A shaft cover support for a gas turbine engine, comprising:
- a cooling fluid chamber having at least one hollow cavity contained within the cooling fluid chamber;
- a radially outward inlet at a first end of the cooling fluid chamber;
- a radially inward outlet at a second end of the cooling fluid chamber;
- a radially outward axial mounting device coupled to an outer wall forming the cooling fluid chamber near the radially outward inlet;
- a radially inward axial mounting device coupled to the outer wall forming the cooling fluid chamber near the radially inward outlet;
- a radially extending inlet transition extending radially from an upstream end of the first axially extending region;
- wherein the radially inward outlet and radially outward inlet are generally aligned with each other, and a radially extending region of the cooling fluid chamber is offset axially relative to the radially inward outlet and radially outward inlet to accommodate a transition of the turbine engine;
- wherein the cooling fluid chamber is formed from a first axially extending region and a second axially extending region separated from the first axially extending region by a radially extending region that is in fluid communication with the first and second axially extending regions;
- a cooling shield supply extending from the cooling fluid chamber between the radially outward inlet and the radially inward outlet on the radially extending region and in fluid communication with the cooling fluid chamber;
- wherein the first axially extending region is longer than the second axially extending region;
- wherein the radially extending region is positioned at an acute angle relative to the first axially extending region;
- wherein the first axially extending region is coupled to the radially extending region via a first curved conduit section; and
- wherein the second axially extending region is coupled to the radially extending region via a second curved conduit section.

16. The shaft cover support of claim 15, wherein the cooling shield supply includes at least one first outlet and at least one second outlet separated by at least one inlet.

17. The shaft cover support of claim 16, wherein at least one first outlet and at least one second outlet of the cooling shield supply are configured to exhaust fluids in a same direction as the radially inward outlet and the cooling shield supply is generally elongated.

18. The shaft cover support of claim 17, wherein the at least one inlet of the cooling shield supply is coupled to the cooling fluid chamber at a surface on the radially extending region nearest the radially outward inlet and the radially inward outlet.

19. The shaft cover support of claim 15, further comprising a radially outer flange having a linear surface with a plurality of orifices configured to receive fasteners and a radially inner attachment surface formed from a linear surface with a plurality of orifices configured to receive fasteners.

20. The shaft cover support of claim 15, further comprising an outward facing attachment flange formed from a linear surface with a plurality of orifices configured to receive fasteners.

21. A turbine engine shaft cover support system, comprising:
- a turbine vane carrier;
- a shaft cover support for a gas turbine engine, comprising:
    - a cooling fluid chamber having at least one hollow cavity contained within the cooling fluid chamber;
    - a radially outward inlet at a first end of the cooling fluid chamber;
    - a radially inward outlet at a second end of the cooling fluid chamber;
    - a radially outward axial mounting device coupled to an outer wall forming the cooling fluid chamber near the radially outward inlet;
    - a radially inward axial mounting device coupled to the outer wall forming the cooling fluid chamber near the radially inward outlet; and
    - a cooling shield supply extending from the cooling fluid chamber between the radially outward inlet and the radially inward outlet on the radially extending region and in fluid communication with the cooling fluid chamber;
- wherein the radially inward outlet and radially outward inlet are generally aligned with each other, and a radially extending region of the cooling fluid chamber is offset axially relative to the radially inward outlet and radially outward inlet to accommodate a transition of the turbine engine;
- a rotor air cooling supply coupled to the radially outward inlet of the shaft cover support for supplying cooling fluid to the shaft cover support;
- an inner ring cooling manifold attached to the radially inward outlet; and
- at least one transition extending through the void created by the radially extending region of the shaft cover support that is offset from the radially inward outlet and radially outward inlet;
- wherein the cooling shield supply is attached to the at least one transition and in fluid communication with a cooling shield within the at least one transition.

22. The turbine engine shaft cover support system of claim 21, wherein the cooling fluid chamber is formed from a first axially extending region, a second axially extending region separated from the first axially extending region by a radially extending region that is in fluid communication with the first and second axially extending regions;
- wherein the first axially extending region is longer than the second axially extending region;
- wherein the radially extending region is positioned at an acute angle relative to the first axially extending region;
- wherein the first axially extending region is coupled to the radially extending region via a curved conduit section; and
- wherein the second axially extending region is coupled to the radially extending region via a curved conduit section.

* * * * *